(12) United States Patent
Gaunt et al.

(10) Patent No.: US 11,843,249 B2
(45) Date of Patent: Dec. 12, 2023

(54) FREQUENCY DOMAIN-BASED DETERMINATION OF CURRENTS FOR INJECTION INTO A POWER NETWORK

(71) Applicant: University of Cape Town, Cape Town (ZA)

(72) Inventors: Charles Trevor Gaunt, Cape Town (ZA); Michel Malengret, Cape Town (ZA)

(73) Assignee: University of Cape Town, Cape Town (ZA)

( * ) Notice: Subject to any disclaimer, the term of this patent is extended or adjusted under 35 U.S.C. 154(b) by 239 days.

(21) Appl. No.: 17/441,142

(22) PCT Filed: Apr. 3, 2020

(86) PCT No.: PCT/IB2020/053211
§ 371 (c)(1),
(2) Date: Sep. 20, 2021

(87) PCT Pub. No.: WO2020/202100
PCT Pub. Date: Oct. 8, 2020

(65) Prior Publication Data
US 2022/0158451 A1    May 19, 2022

(30) Foreign Application Priority Data
Apr. 4, 2019    (GB) ...................................... 1904736

(51) Int. Cl.
*H02J 3/06*    (2006.01)
*H02J 3/46*    (2006.01)

(52) U.S. Cl.
CPC ..................... *H02J 3/06* (2013.01);
*H02J 3/46* (2013.01); *H02J 2203/20* (2020.01)

(58) Field of Classification Search
CPC ........ H02J 3/06; H02J 3/46; H02J 3/38; H02J 3/00; H02J 3/18; H02J 3/0075;
(Continued)

(56) References Cited

U.S. PATENT DOCUMENTS

2008/0147335 A1*  6/2008  Adest ................... G01R 22/063
702/188

FOREIGN PATENT DOCUMENTS

GB    2 521 414 A    6/2015
GB    2 521 414 B    1/2016
(Continued)

OTHER PUBLICATIONS

Halpin, M. S., et al. "Frequency-Domain Harmonic Analysis Methods," *IEEE Power Engineering Society: Tutorial in Harmonics Modeling and Simulation*, 1998, pp. 49-54.

*Primary Examiner* — Jeffrey M Shin
(74) *Attorney, Agent, or Firm* — Womble Bond Dickinson (US) LLP

(57) ABSTRACT

A system and method for determining currents for injection into or extraction from a power network are provided. In a method conducted at a point of common coupling to the network, Thévenin parameter data structures for each of a Thévenin voltage, resistance and inductance, are compiled. An offset data structure including offset values is compiled for application to corresponding values of the Thévenin voltage data structure to output an offset Thévenin voltage data structure. Offset values are calculated to satisfy physical constraints associated with the network. An optimal point of common coupling power data structure and the offset Thévenin voltage data structure are used to calculate current components for determining current for injection into or extraction from corresponding lines at the point of common coupling to reduce total electrical transmission losses of the network. The method may use the frequency domain and
(Continued)

may include using frequency-dependent Thévenin parameters.

12 Claims, 5 Drawing Sheets

(58) Field of Classification Search
CPC ... H02J 2203/02; H02J 2203/10; Y02E 60/00; Y04S 40/20
See application file for complete search history.

(56) References Cited

FOREIGN PATENT DOCUMENTS

| | | |
|---|---|---|
| GB | 2 567 460 B | 2/2020 |
| WO | WO 2017/140479 | 8/2017 |

* cited by examiner

US 11,843,249 B2

FREQUENCY DOMAIN-BASED DETERMINATION OF CURRENTS FOR INJECTION INTO A POWER NETWORK

CROSS-REFERENCE TO RELATED APPLICATIONS

This application is a national stage filing under 35 U.S.C. 371 of PCT/IB2020/053211, filed Apr. 3, 2020, which International Application was published by the International Bureau in English on Oct. 8, 2020, as WO 2020/202100, which claims priority from United Kingdom patent application number 1904736.4 filed on 4 Apr. 2019, which applications are hereby incorporated in their entirety by reference in this application.

FIELD OF THE INVENTION

The invention relates to frequency domain-based determination of currents for injection into a power network so as to reduce transmission losses associated with delivery of an amount of power.

BACKGROUND TO THE INVENTION

Traditionally, power in a multi-line system is injected into the lines of a network equally in magnitude and with the same angle (or displacement) between the current and voltage at the point of connection. However, this is not necessarily the most efficient way for power to flow to its point of consumption as the resistance and reactance characteristics as well as the voltage of each line may not always be the same and may vary with frequency.

In GB 2,521,414 B the Applicant provided a method and system for injecting power into or extracting power out of a power network. In a method disclosed therein, an equivalent Thévenin circuit is derived for the network with respect to a point of common coupling, the equivalent Thévenin circuit having an equivalent voltage, resistance, and reactance in series that vary with time. An optimised electric current is determined to inject into or extract from the network so as to minimise losses in the network and to ensure that maximum power from the power source reaches the consumer. The Thévenin parameters are calculated, a total Thévenin power is calculated, and the current compensation is calculated based on the Thévenin power and the Thévenin parameters.

The formulation in GB 2,521,414 B is a time domain one and may only lead to optimal results if the resistances and inductances are not frequency dependent. In order to account for the effect of frequency dependent line impedances (resistance, inductance and capacitance), a formulation in the frequency domain may be required. Although there have been efforts to derive a suitable frequency domain formulation, there remains scope for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a method comprising: compiling Thévenin parameter data structures for each of a Thévenin voltage, resistance and inductance, wherein each data structure has values for each of one or more lines at each of a predetermined set of frequencies, the values having been obtained at a point of common coupling to a power network having the one or more lines; compiling an offset data structure including offset values, each of which is to be applied to a corresponding value of the Thévenin voltage data structure to output an offset Thévenin voltage data structure, wherein the offset values are calculated to satisfy physical constraints associated with the power network; compiling the offset Thévenin voltage data structure; compiling an optimal point of common coupling power data structure including values having been determined based on a specific amount of total power at the point of common coupling and the offset Thévenin voltage data structure or a derivative thereof; using the optimal point of common coupling power data structure and the offset Thévenin voltage data structure to calculate current components for each line and for each of the predetermined set of frequencies for determining current for injection into or extraction from corresponding lines at the point of common coupling so as to inject or extract a specific total amount of power in a manner that reduces total electrical transmission losses of the power network; and, controlling injecting or extracting, at the point of common coupling, currents associated with the current components to reduce total electrical transmission losses of the power network.

The method may be a computer-implemented method for frequency domain-based determination of currents for injection into a power network.

Further features provide for method to include determining the offset values, for determining the offset values to be based on a projection of the Thévenin voltage data structure or a weighted Thévenin voltage data structure onto vectors in a solution subspace in which the optimal current components are to reside; for the vectors in the solution subspace to be represented by solution subspace data structures; for a solution subspace data structure to be provided for each of the number of frequencies in the predetermined set of frequencies, and for values of each of the solution subspace data structures to represent vectors which are orthogonal to each other.

A still further feature provides for the offset values to be calculated to satisfy physical constraints including one or both of Kirchhoff's current law and the requirement that values of the optimal point of common coupling power data structure remain the same before and after injection or extraction of the current components.

A yet further feature provides for the values of the solution subspace data structures to include the values of the Thévenin resistance and inductances data structure.

An even further feature provides for values of the Thévenin parameter data structures to be time variable values in the form of frequency domain-based complex root mean square (CRMS) values.

The method may be conducted at the point of common coupling by a device, such as a compensator, a converter or an inverter, coupled to the power network.

The specific amount of total power at the point of common coupling may be a specific amount of total average power over a predetermined time period.

In accordance with a further aspect of the invention there is provided a system including a memory for storing computer-readable program code and a processor for executing the computer-readable program code, the system comprising: a Thévenin parameter data structure compiling component for compiling Thévenin parameter data structures for each of a Thévenin voltage, resistance and inductance, wherein each data structure has values for each of one or more lines at each of a predetermined set of frequencies, the values having been obtained at a point of common coupling to a power network having the one or more lines; an offset data structure compiling component for compiling an offset data structure including offset values, each of which is to be applied to a corresponding value of the Thévenin voltage data structure to output an offset Thévenin voltage data structure, wherein the offset values are calculated to satisfy physical constraints associated with the power network; an offset Thévenin voltage data structure compiling component for compiling the offset Thévenin voltage data structure; an optimal point of common coupling power data structure compiling component for compiling an optimal point of common coupling power data structure including values having been determined based on a specific amount of total power at the point of common coupling and the offset Thévenin voltage data structure or a derivative thereof; a current component calculating component for calculating, using the optimal point of common coupling power data structure and the offset Thévenin voltage data structure, current components for each line and for each of the predetermined set of frequencies for determining current for injection into or extraction from corresponding lines at the point of common coupling so as to inject or extract a specific total amount of power in a manner that reduces total electrical transmission losses of the power network; and, a current injecting/extracting component for controlling injecting or extracting, at the point of common coupling, currents associated with the current components to reduce total electrical transmission losses of the power network.

The system may be for frequency domain-based determination of currents for injection into a power network. The system may include a connector configured for electrically connecting to the power network at the point of common coupling, wherein the current injecting/extracting component controls injecting or extracting currents associated with the current components via the connector.

In accordance with a further aspect of the invention there is provided a computer program product comprising a computer-readable medium having stored computer-readable program code for performing the steps of: compiling Thévenin parameter data structures for each of a Thévenin voltage, resistance and inductance, wherein each data structure has values for each of one or more lines at each of a predetermined set of frequencies, the values having been obtained at a point of common coupling to a power network having the one or more lines; compiling an offset data structure including offset values, each of which is to be applied to a corresponding value of the Thévenin voltage data structure to output an offset Thévenin voltage data structure, wherein the offset values are calculated to satisfy physical constraints associated with the power network; compiling the offset Thévenin voltage data structure; compiling an optimal point of common coupling power data structure including values having been determined based on a specific amount of total power at the point of common coupling and the offset Thévenin voltage data structure or a derivative thereof; using the optimal point of common coupling power data structure and the offset Thévenin voltage data structure to calculate current components for each line and for each of the predetermined set of frequencies for determining current for injection into or extraction from corresponding lines at the point of common coupling so as to inject or extract a specific total amount of power in a manner that reduces total electrical transmission losses of the power network; and, controlling injecting or extracting, at the point of common coupling, currents associated with the current components to reduce total electrical transmission losses of the power network.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Figure 1:
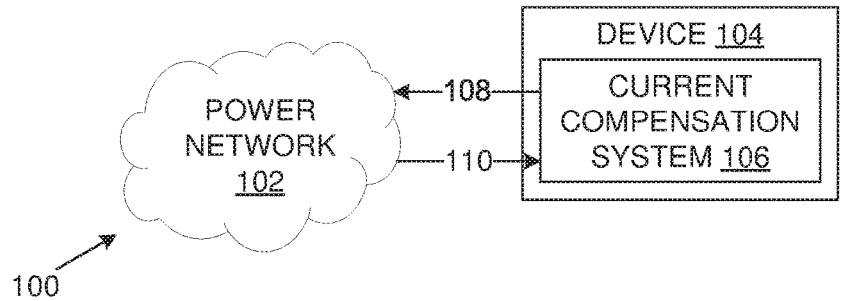
FIG. 1 is a schematic diagram which illustrates a system for determining currents for injection into or extraction from a power network according to aspects of the present disclosure.

Aspects of the present disclosure provide a system and method for determining currents for injection into or extraction from a power network at a point of common coupling. The currents are determined to minimise transmission losses. The currents that are determined may be so-called 'active currents,' which are generally understood to be those line (or wire) currents that transport power from or to a network with minimal transmission losses. Active currents may therefore be defined as those line current components that produce the least associated losses in the network for the specific power being introduced into or drawn from the network at a point of common coupling (PCC), assuming the characteristics of the network remain constant. Defining active currents as the line current components producing the minimum losses in the network for the specific power to be delivered may allow a rigorous definition of apparent power based on a model independent of assumptions about sinusoidal waveform, voltage and current balance, and frequency-dependent wire resistances.

Aspects of the present disclosure implement a generalized frequency domain approach to the derivation or determination of active currents, which formulation uses Thévenin parameters of a network and utilises a specific reference, or offset, for each and every voltage frequency component. Aspects of the present disclosure may therefore allow for the determination of active currents in the presence of frequency dependent line resistances and inductances.

Aspects of the present disclosure may find application in a wide range of power system situations, including small scale power electronics for photovoltaic distributed power injection into 'smart grids', 'mega grids' with flexible alternating current transmission system (FACTS) devices and large-scale power transformers in the presence of direct current (DC) components. Aspects of the present disclosure may find application in a compensator (e.g. static VAR compensator, static synchronous compensator, etc.), inverter (e.g. grid-tied inverter or the like) or other suitable apparatus configured to modify an original set of line currents in such a way that the same amount of power is transported to the network or section of the network, but with minimal possible losses. Aspects of the present disclosure may further find application in the optimization of the operating cycle of storage batteries (including, e.g., small customer-based and larger utility scale units). This may be achievable by inclusion of subharmonic frequencies (e.g. frequencies being lower than the rated power frequency, which is typically 50 or 60 Hz) and by obtaining voltage and current values over intervals of a longer period of time.

In the case of smart grids, for example, aspects of the present disclosure may find application in controlling power electronics to transport only the useful (optimal) energy to the grid and supplying locally the components of power for which no net energy is required. Since battery energy storage systems (BESS) and most distributed generation already include power electronic controllers, the adoption of more appropriate control algorithms using the systems and methods described herein has the potential to reduce total energy losses, consistent with economic cost allocation. Other potential applications of the systems and methods described herein include load compensators including static synchronous compensators (STATCOMs), the injection of renewable energy in transmission systems, voltage stability analysis (especially where distortion by geomagnetically induced currents severely compromises conventional approaches), in tariffs and revenue transactions, in power quality assessment, steady state power flow modelling, planning and operation, and the like.

FIG. 1 is a schematic diagram which illustrates a system (100) for determining currents for injection into or extraction from a power network (102) according to aspects of the present disclosure. Various scales of power network are anticipated. In some implementations, for example, the power network may include or be in the form of a load network. The power network may be in the form of small networks or micro-grids or large national grids with loads and supplies of many different forms. In other implementations, the power network may include storage batteries ranging from small end-user-based units to larger, power utility scale units. The power network (102) may include multiple nodes and may constantly evolve as a result of loads and power generation availability changes.

The system may include a device (104) configured for injection of current into or extraction of current from the power network (102). The device (104) may be in the form of a converter or invertor or other suitable apparatus, although other implementations are anticipated. The device (104) may include a current compensator system (106) which dynamically determines the optimal current components for injection into or extraction from the power network (102) in order to minimise losses across the power network (102).

Figure 2:
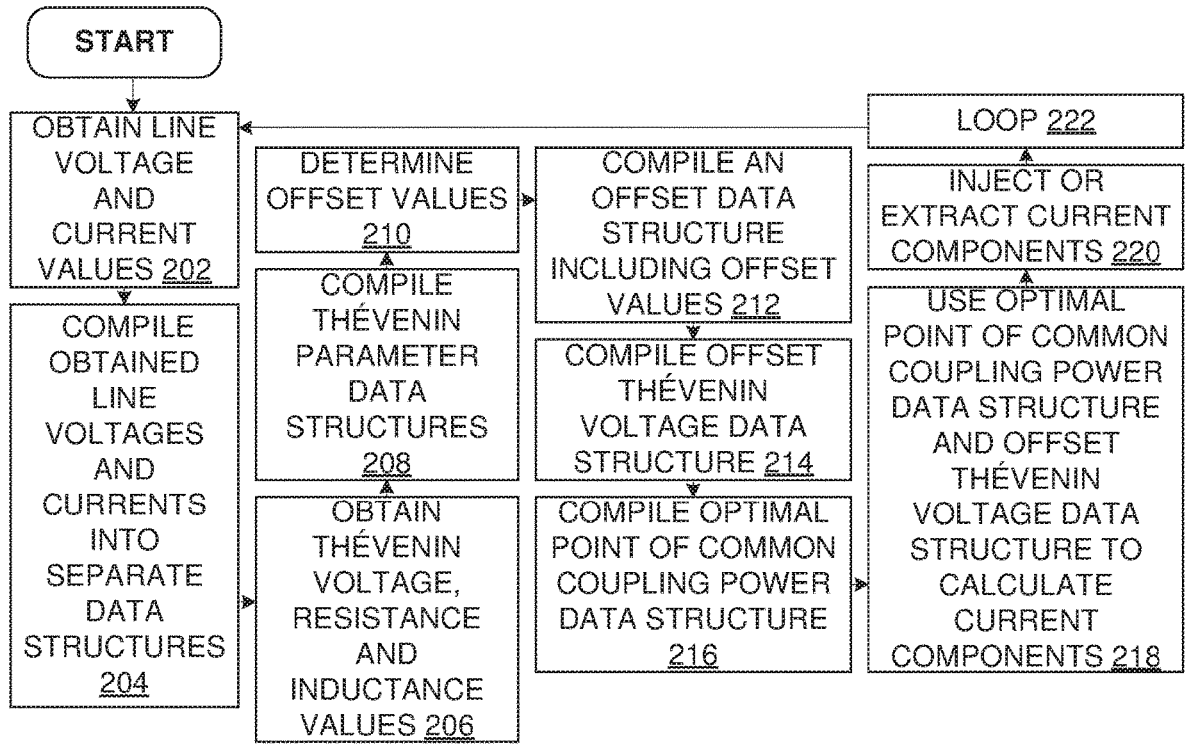
FIG. 2 is a flow diagram which illustrates an exemplary method for determining currents for injection into or extraction from a power network.
Figure 3:
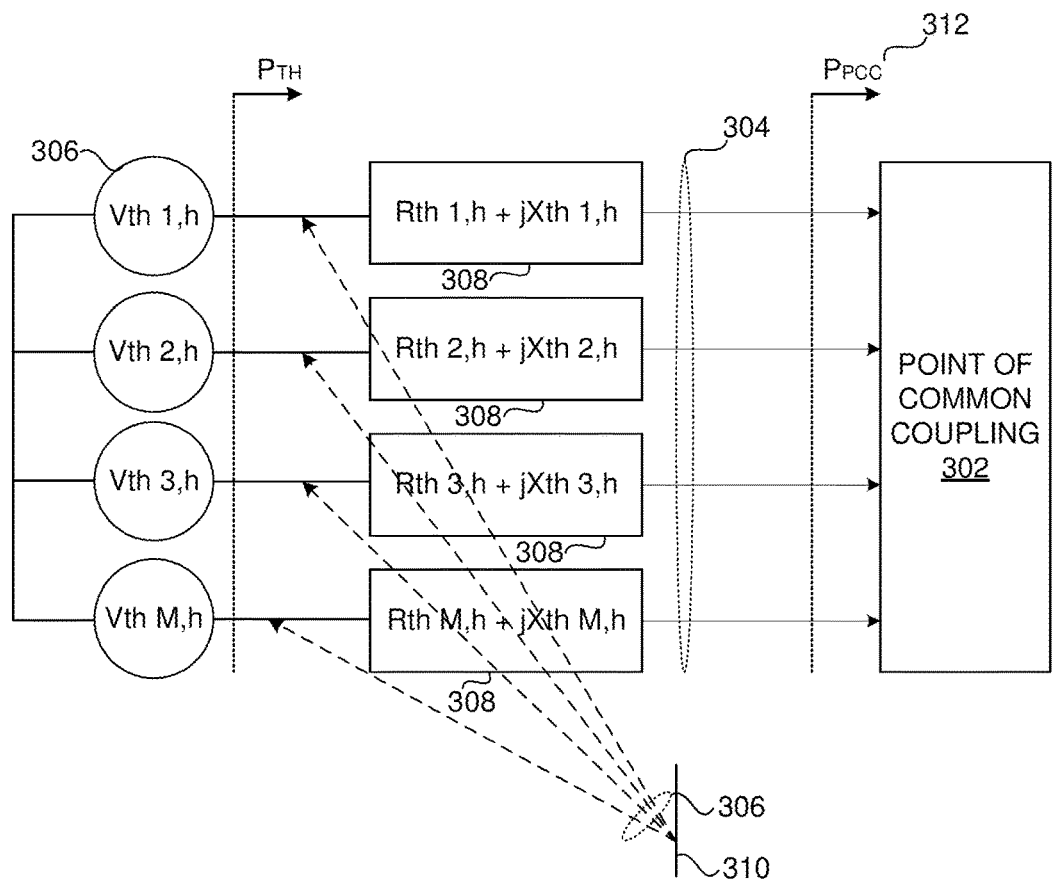
FIG. 3 is a schematic diagram which shows an example Thévenin equivalent circuit for an M line power network.

The system (100) and in particular, the device (104) and/or current compensation system (106) described above may implement a method for determining currents for injection (108) into or extraction (110) from the power network. An exemplary method for determining currents for injection or extraction of power into or from a power network is illustrated in the flow diagram of FIG. 2. Aspects of the method are further described with reference to FIG. 3, which shows an example Thévenin equivalent circuit for an M line power network.

The method may be conducted at a point of common coupling (302) to a power network (102) having M lines (or wires), where M is greater than or equal to one. The method may be conducted by a current compensation system (106) of, or connected to, a device (104) connected to the power network (102) at the point of common coupling. The method may thus be a computer-implemented method. The operations of the method described below may be conducted based on values that are measured at the point of common coupling over a predetermined time period, T. The length of the time period T may vary according to the application. It may be that the length of the time period T at least approximates or is larger than the inverse of the rated power frequency (which may for example be in the region of 50 or 60 Hz). In some applications, however, the time period T may be much larger.

For example, in some cases it may be possible to store and retrieve energy over a time period which is longer than 1 cycle (e.g. in the case of batteries rather than AC capacitors) and aspects of the present disclosure may be extended to further the transmission efficiency. This could be done by selecting a longer Fourier period T of integration (e.g. in the order of hours or even days) or by including multiples of the power frequency period. Such an implementation may ensure that the same average power would reach the consumer but with further reduction in total losses over the longer period. This may be possible as the power transported during any cycle need not be the same in this case as the power consumed or delivered by the PCC side. In such a case, $K_A$, which may be constant throughout T, may vary accordingly with the time period chosen. Vth vector on the other hand may vary from cycle to cycle as well as its necessary correct reference point.

The method may include obtaining (202) line voltage and current values for each of the M lines. The obtained voltage and current values may be time variable voltage and current values and may be adequately expressed as Fourier components with a finite set of complex root mean square (CRMS) values. Obtaining the line voltage and current values may include using suitable fast-Fourier transform (FFT) techniques or Discrete Fourier Analysis (using e.g. a discrete Fourier Transform, DST) of line voltages and currents or the like. These could be obtained by processing measured samples taken at the point of common coupling and meeting the Nyquist criterion of sampling at a frequency at least twice that of the highest frequency components needed to represent the original line voltages and currents.

Obtaining (202) line voltages may for example include measuring M voltage signals (represented in the time domain as f(t)) at the point of common coupling side and adequately expressing these signals as a set of H+1 components (including DC) in the complex RMS Fourier domain. Each line may therefore have H+1 components expressed as a magnitude and angle (or real and imaginary real number). The line currents (304), which may be the same at the point of common coupling side and a Thévenin voltage side, may also be expressed as a magnitude and angle for each of H+1 components.

The obtained line voltage and current values may be a condense representation of distorted currents and voltages of each of the M lines over the predetermined time period, T. The obtained line voltage and current values may be adequately represented with a predetermined, finite set of H+1 Fourier frequencies (including the DC component). The sampled frequencies may include one or more of harmonics, sub-harmonics and sidebands of the power frequency. In the case of sidebands, continuous Fourier analysis may be performed, especially for long periods, say of a day. Obtaining line voltage and current values may include obtaining values in the form of complex voltage (U) and current (is) components (e.g. values in the form of phasors).

The obtained line voltages and currents for all frequencies may be compiled (204) into separate data structures (U and is respectively), each of which may be in the form of complex vectors constructed from each of the M lines' CRMS values. The data structures may be represented as follows.

$U = \{(U_{1,0}, U_{1,1}, U_{1,2}, \ldots U_{1,H}), (U_{2,0}, U_{2,1}, U_{2,2} \ldots U_{2,H}), \ldots, (U_{M,0}, U_{M,1}, U_{M,2}, \ldots U_{M,H})\}$ $I_S = \{(I_{1,0}, I_{1,1}, I_{1,2}, \ldots I_{1,H}) (I_{2,0}, I_{2,1}, I_{2,2} \ldots I_{2,H}), \ldots, (I_{M,0}, I_{M,1}, I_{M,2}, \ldots I_{M,H})\}$ where m=1 to M and h=0 to H. Each of the data structures may therefore have a dimension of M×(H+1). The obtained line voltages may be referred to an arbitrarily chosen reference at the PCC voltages (and hence may be termed "PCC voltages") or, when referring to the data structure a 'local PCC data structure of offset voltages,' which is expressed in sufficient Fourier components needed for accurate representation.

The method may include obtaining (206) Thévenin voltage (306), resistance and inductance (308) values for each of the M lines and H+1 frequencies. Obtaining the Thévenin resistance and inductance (308) values may include measuring these values at the point of common coupling (302).

Any suitable technique or method may be used for measurement of the Thévenin resistance and inductance. Measurement of the Thévenin parameters may be at one or both of harmonic frequencies and DC. In some implementations, measurement of the Thévenin parameters may include the measurement of 'constant' (or near constant) values of resistance and inductance at any frequency. In other implementations, measurement of the Thévenin parameters may include measurement of each frequency dependent resistance and inductance at that harmonic frequency. This may be because the 'distortion' of inductance (or resistance) within a wavelength can be represented as the harmonics of the inductance.

In one implementation, for example, measuring the Thévenin resistance and inductance may include drawing and injecting a current in-phase with the load and measuring side lobes of the signal and to derive the parameters at harmonic frequencies. This technique may be an adaption of the technique described in GB 2,521,414 B, the disclosure of which is incorporated by reference herein for all purposes. In another implementation, a modulated current may be used, which modulation may be at the harmonic frequency. Such a technique may be an adaption of the technique described in the Applicant's UK patent GB 2,567,460 B, the disclosure of which is incorporated by reference herein for all purposes.

Obtaining the Thévenin voltage values may include using the Thévenin resistance and inductance values as well as the PCC voltage values to compute the Thévenin voltage. This may include adding the voltage drops across each of the respective lines and harmonic impedances. The Thévenin voltage values may hence be referenced (310) to the same original PCC reference. The Thévenin voltage values may be in the form of CRMS Thévenin side voltage components with respect to the original voltage reference and may be calculated as follows:

$$V_{Thm,h} = U_{m,h} + Z_{m,h} I_{m,h}, \text{ where } Z_{m,h} = R_{m,h} + j2\pi f h L_{m,h},$$

for m=1 to M and h=0 to H.

The method may include compiling (208) Thévenin parameter data structures for each of the Thévenin voltage, resistance and inductance values. Each of these data structures may have values for each of the M lines at each of the H+1 frequencies. As mentioned, the values may have been obtained at the point of common coupling. The Thévenin voltage data structure may be based on the same reference as at the PCC. The Thévenin voltage data structure may be in the form of an M×(H+1) Thévenin complex voltage vector having the following form:

$V_{Th} = \{(V_{Th1,0}, V_{Th1,1}, V_{Th1,2}, \ldots V_{Th1,H}) (V_{Th2,0}, V_{Th2,1}, V_{Th2,2}, \ldots V_{Th2,H}), \ldots, (V_{ThM,0}, V_{ThM,1}, V_{ThM,2}, \ldots V_{ThM,H})\}$ The method may include determining (210) offset values. Determining (210) the offset values may include calculating the values to satisfy physical constraints. The physical constraints may include one or both of Kirchhoff's current law and the requirement that values of an optimal point of common coupling power data structure remain the same before and after injection or extraction of optimal current components (or the so-called active currents). Satisfying Kirchhoff's current law implies that the sum of all the Fourier current components of all the wires add up to zero for each frequency and not just the total current of all the components. As Kirchhoff's law extends to all current Fourier components, a voltage reference offset for each voltage frequency respectively may be required and may be determined.

Determining (210) the offset values may include determining values which project the values of the Thévenin voltage data structure or a derivative thereof (e.g. weighted Thévenin voltage data structure) onto a particular solution subspace. The solution subspace may be a space that represents all of the physical constraints of the M by (H+1) sub-vector space. The solution subspace may be that onto which an original weighted current vector ($I_S' = I_S R^{1/2}$) is to be projected in order to find the minimal weighed norm vector and, in turn, the weighed active current vector $I_A'$ which delivers the required total power at the point of common coupling ($P_{PCC}$).

The inventors have shown that the vectors $1_0'$, $1_1'$, $1_2'$, \ldots $1_H'$ must also be considered to be necessary coordinate vectors in defining the solution subspace where (or in which) the optimal or active current vector $I_A$ must reside. The proposed reason for this is that Kirchhoff's current law must be true, not exclusively for the total currents of the wires, but also for each current Fourier component. This results in "correct" reference offsets to be used from the PCC reference, which are not necessarily the same for all frequencies.

Furthermore $1_0'$, $1_1'$, $1_2'$, ... $1_h'$ can each be seen to be orthogonal to each other and therefore can be used as H+1 necessary coordinate vectors that define the correct solution subspace. The vectors $1_1'$, $1_2'$, ... $1_H'$, for any h in the range h=0 to H may be defined as:

$1_0' = \{(R_{1,0}^{-1/2}, R_{1,1}^{-1/2}, \ldots R_{1,H}^{-1/2}), (0, 0, \ldots, 0), \ldots, (0, 0, \ldots, 0)\}$ $1_1' = \{(0, 0, \ldots 0), (R_{2,0}^{-1/2}, R_{2,1}^{-1/2}, \ldots, R_{2,H}^{-1/2}), \ldots, (0, 0, \ldots, 0)\}$

...

$1_H' = \{(0, 0, \ldots 0), (0, 0, \ldots, 0), \ldots, (R_{M,0}^{-1/2}, R_{M,1}^{-1/2}, \ldots, R_{M,H}^{-1/2})\}$ Because the values of the Thévenin voltage data structure (which may be in the form of a vector) measured with respect to the PCC reference common point is not necessarily orthogonal to the vectors $1_0'$, $1_1'$, ... $1_H'$, another orthogonal Thévenin voltage data vector must be found that is representative of the Thévenin voltages and is mutually orthogonal to the necessary vectors representing the solution subspace.

The inventors have found that this can be done using the Gram-Schmidt method which involves subtracting all the components which are in the direction $1_0'$, $1_1'$, ... $1_H'$ from the values of the original Thévenin voltage data structure or a derivative thereof. This is in effect a projection of the values of the Thévenin voltage data structure or a derivative thereof onto each $1_h'$ for h=0 to H, which projection determines the weighted offset values $e'_{ref\ h}$, which can be expressed as:

$$e'_{ref\ h} = \langle V'_{Th}, 1_h' \rangle 1_h' / \|1_h'\|^2 = (\sum_{m=1}^{m} V_{TH,m,h} R_{m,h}^{-1} / \sum_{m=1}^{m} R_{m,h}^{-1}) 1_h' \text{ for } h = 0 \text{ to } H$$

Which is in the unweighted domain expressed as:

$$e_{refh} = (\sum_{m=1}^{m} V_{TH,m,h} R_{m,h}^{-1} / \sum_{m=1}^{m} R_{m,h}^{-1}) 1_h \text{ for } h=0 \text{ to } H$$

This method includes subtracting all the unweighted voltage offsets components $e_{ref,h}$ for every h from $V_{TH,m,h}$ to obtain $V_{TH,m,h(null)}$.

The offset values may therefore be based on a projection of the values of the Thévenin voltage data structure or a derivative thereof (e.g. a weighted Thévenin voltage data structure), being $V_T$, or $V_{TH}'$, onto vectors in the weighted solution vector subspace in which the optimal weighted current components are to reside. The solution currents $I_A$ vectors may be represented by solution weighted subspace data structures (being determined by the orthogonal set consisting of: $1_0'$, $1_1'$, ... $1_H'$ and $V_{TH}'$).

As shown above, a solution subspace data structure may be provided for each of the H+1 frequencies. The values of each of the solution subspace data structures may represent vectors which are orthogonal to each other. Further, as shown above, the values of the solution subspace data structures may include the values of the Thévenin resistance and inductance data structure, being $R_{m,h}^{-1/2}$.

The method may include compiling (212) an offset data structure ($e_{ref}$) including the offset values, each of which is to be applied to a corresponding value of the Thévenin voltage data structure to output an offset Thévenin voltage data structure. The offset data structure may have the following form $e_{ref} = \{e_{ref1}, e_{ref2}, \ldots e_{refH}\}$. As mentioned in the foregoing, the offset values are calculated to satisfy physical constraints associated with the power network.

The method may include compiling (214) the offset Thévenin voltage data structure. The offset Thévenin voltage data structure may be calculated using a reference derived from the Thévenin voltages referred to the PCC. This may include subtracting values in the offset data structure from corresponding values in the Thévenin voltage data structure, for example as follows:

$$V_{TH(null)} = V_{TH} - e_{ref}$$

which may be weighted as follows:

$$V'_{TH(null)} = V'_{Th} - e'_{ref} = (V_{Th} - e_{ref}) R^{-\frac{1}{2}} = V_{TH(null)} R^{-1/2} =$$
$$\{((V_{1,0} - e_{ref\ 0}) R_{1,0}^{-1/2}, (V_{1,1} - e_{ref\ 0}) R_{1,1}^{-1/2}, \ldots, (V_{1,H} - e_{ref\ 0}) R_{1,H}^{-1/2}),$$
$$((V_{2,0} - e_{ref\ 1}) R_{2,0}^{-1/2}, (V_{2,1} - e_{ref\ 1}) R_{2,1}^{-1/2}, \ldots, (V_{2,H} - e_{ref\ 1}) R_{2,H}^{-1/2}),$$
$$( \ldots\ldots\ldots\ldots, \ldots\ldots\ldots\ldots\ldots, \ldots, \ldots\ldots\ldots\ldots\ldots ),$$
$$((V_{M,0} - e_{ref\ H}) R_{M,0}^{-1/2}, (V_{M,1} - e_{ref\ H}) R_{M,1}^{-1/2}, \ldots,$$
$$(V_{M,H} - e_{ref\ H}) R_{M,H}^{-1/2})\}$$

where for h=0 to H and m=1 to M: $e_{refh} = (\sum_{m=1}^{m} V_{TH,m,h} R_{m,h}^{-1} / \sum_{m=1}^{m} R_{m,h}^{-1})$.

The method may include compiling (216) an optimal point of common coupling power data structure ($P_{PTH(opt)}$) including values having been determined based on a specific amount of total power at the point of common coupling ($P_{PCC}$) and the offset Thévenin voltage data structure or a derivative thereof, such as a weighted Thévenin voltage data structure (e.g. the magnitudes of all voltage components). Determining the values of the optimal point of common coupling power data structure may include using the total power at the point of common coupling and the minimum achievable line losses ($\|I_A'\|$), which may be based on the offset Thévenin voltage data structure or a derivative thereof (as shown below). The total power at the point of common coupling may be the total active power at the point of common coupling. The specific amount of total power at the point of common coupling may be a specific amount of total average power over a predetermined time period (T).

Compiling (216) the optimal point of common coupling power data structure ($P_{PTH(opt)}$) may include calculating values for the data structure using the equation:

$$P_{PTH(opt)} = P_{PCC} +/- \|I_A'\|^2$$

where $$\|I_A'\| = \frac{1}{2}(-\|V_{TH(null)}'\| -/+ \sqrt{(\|V_{TH(null)}'\|^2 + 4 P_{PCC})}),$$

where $$P_{PCC} = \langle U, I_S \rangle = \sum_1^M \sum_0^H U_{m,h} * I_{m,h}^* \text{ for } m=1 \text{ to } M \text{ and } h=0 \text{ to } H$$

and where $V_{TH(null)}'$ represents a weighted offset Thévenin voltage data structure (i.e. a derivative of the offset Thévenin voltage data structure). Values of the weighted offset Thévenin voltage data structure may be computed by applying a weighting to the values of the offset Thévenin voltage data structure. The weighting may for example be performed by dividing the values of the offset Thévenin voltage data structure by respective square root Thévenin line resistance values, for example as follows:

$$V_{TH(null)}' = V_{Th(null)} R^{-1/2}$$

where R is a square matrix with M×(H+1) rows and M×(H+1) columns, where the diagonal vector R(diag)={

$(R_{1,0}, R_{1,1}, \ldots R_{1,H}), (R_{2,0}, R_{2,1} \ldots R_{2,H}), \ldots (R_{M,0}, R_{M,1}, \ldots R_{M,H})\}$ and where all other elements of the R matrix are zero.

The method may include using (218) the optimal point of common coupling power data structure and the offset Thévenin voltage data structure or a derivative thereof to calculate current components for each line and for each of the predetermined set of frequencies. The current components may be used to determine currents for injection into or extraction from corresponding lines at the point of common coupling, so as to inject or extract a specific total amount of power in a manner that reduces total electrical transmission losses of the power network.

The current components may be computed as follows:

$$I_A = K_A V_{Th(null)} R^{-1}$$

where $$K_A = \frac{P_{TH(OPT)}}{\|V'_{TH(null)}\|^2}$$

The current components ($I_A$) may be active current components. The current components may be output in a data structure including active current values for each of the M lines and H+1 frequencies. The values may be in the form of phasors (i.e. including a magnitude component and an angle component). The current components may be output for use by the device in injecting or extracting currents, having the values based on the current components, into the power network at the point of common coupling. Individual CRMS solution current components may be $$I_{A(m,h)} = K_A \frac{V_{Th(null)(m,h)}}{R(m, h)}$$

for all m and h.

The current components and/or current component data structure may be input into the device (104) as a set of instructions configured or arranged to cause the device (104) to inject or extract current into or from the power network (102) in accordance with the current components.

The operations described above may be performed to determine the minimal loss current CRMS vector representing optimal current components that will deliver $P_{PCC}$ power (the average power over a period T chosen) (312) to a point of common coupling with minimal losses. The method may use a more generalized formulation ($I_A = K_A V_{Th(null)} R^{-1}$) than any prior art implementations and may not require assumptions such as equal line resistors and inductances; invariant voltages with compensation; frequency independent line resistors and inductances, and the like.

All of the active CRMS current components in the current component data structure (i.e. each $I_{A(m,h)}$ in the data structure $I_A$) may be: proportional, by a common factor $K_A$; proportional to each of their respective weighted Thévenin voltages CRMS components $v_{Th(null)(m,h)}$ measured from their respective harmonic weighted null point reference; and, proportional to the inverse respective line resistance.

It should be noted that the frequency domain approach described herein may be performed by using data extracted by a separate device which has extracted the relevant Fourier coefficients of magnitude and phase angle using a Fourier transform without having to resort to the original instantaneous voltages and current values or sample values. Therefore, the data input may be more condensed which may lower data transfer requirements and computational overheads in determining compensation currents and controlling the network as is the case with the instantaneous value approach.

As mentioned above, the case where the Fourier voltages and currents coefficients are derived from instantaneous sample values taken at a regular sample rate, the sample rate would need to consider the Nyquist sampling criterion and therefore be at least as twice as high that of the highest frequency of interest representing the original voltage and current signals measured at the point of common coupling. Instead of all the instantaneous measurements of voltages and currents, only the Fourier coefficients of voltages and currents are required for the purpose of calculating the compensating currents. The bandwidth capacity required between the Fourier transform (e.g. FFT or DFT) based instrument and the compensator may be lower than dealing with the original measured voltages and currents.

The method may include injecting or extracting (220) the current components at the point of common coupling to reduce total electrical transmission losses of the power network. Injecting or extracting current components may include controlling the injection or extraction of currents associated with the current components. Injection or extraction may be performed by the device (104) based on input current components and/or a current component data structure. The currents injected into or extracted from the power network may be the difference between $I_S$ and $I_A$. The current injected into or extracted from the power network may be termed the compensation currents ($I_C$) and may be those currents that are injected/extracted at the PCC in order to effect or achieve the active current components.

The method may include looping (222) or repeating such that the current component data structure is continually updated (and so too are the active current components which are injected or extracted) to take into account changing power network conditions (including for example, the effects of the injection or extraction (220) of the current components to reduce losses). The method may thus be conducted in real-time as current is injected or extracted into or from the power network for continual updating of the current components for optimal delivery of power.

The operations of the method may be performed using current and voltage values obtained over a period of time T. It should however be appreciated that the operations (or calculations) performed on these values may be completed within a period of time which is much less than T. The data structures utilised in the method may be updated periodically (e.g. every T units of time) with values that represent the latest condition or predictions of the network.

Aspects of the present disclosure make use of a Fourier approach in which components that might be more easily applied to power system calculations are derived (possibly using well established software already in use for power systems analysis or harmonic flow analysis). Aspects of the present disclosure may apply to the average power domain as well as to periods longer than a power cycle, since the Fourier transform operations may require a whole wavelength, and may provide an average power application. The method described in the foregoing may allow for resistance skin effect to be more accurately taken into account in determining the currents for injection. It should be noted that calculations in the method described above are referred to the Thévenin equivalent voltage point and its null reference, despite all measurements being made locally at the point of common coupling.

Aspects of the present disclosure may therefore enable correction/calculation with reference to the source instead of the local point of common coupling by applying the Thévenin equivalent circuit model specifically in the frequency domain. As mentioned, frequency dependent line parameters may be accommodated, thereby removing a previously restrictive assumption. Further, performing operations in the frequency domain may result in reduced data required for calculations, which may in turn lower data transportation, storage and computation requirements. Implementation of the method described above may require low data transfer volumes, as frequency components derived from measured voltages and currents, and can be carried out by inexpensive processors.

Figure 4:
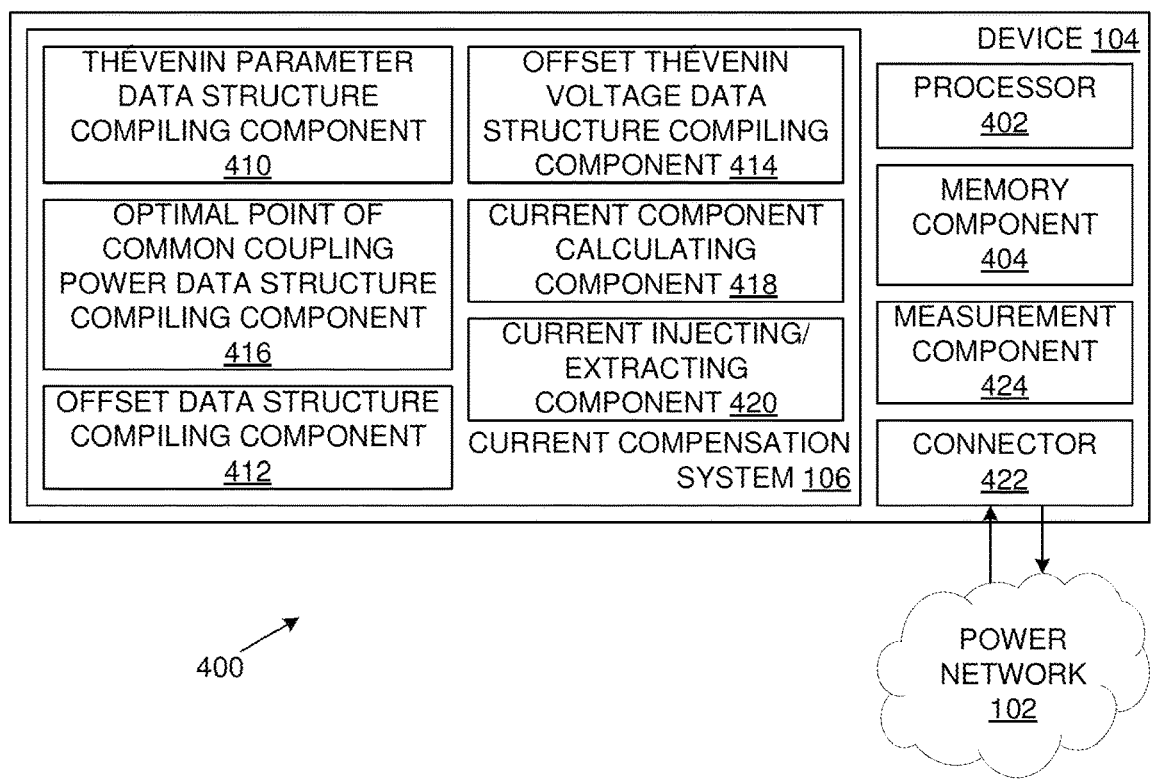
FIG. 4 is a block diagram which illustrates components of a system for determining currents for injection into or extraction from a power network according to aspects of the present disclosure.

Various components may be provided for implementing the method described above with reference to FIG. 2. FIG. 4 is a block diagram which illustrates exemplary components which may be provided by a system (400) for determining currents for injection into or extraction from a power network according to aspects of the present disclosure. The system (400) may include a device (104) which provides or has access to a current compensation system (106). The device (104) may include the current compensation system (106) or may be physically and/or logically separated therefrom yet in data communication therewith.

The device (104) and/or current compensation system (106) may include a processor (402) for executing the functions of components described below, which may be provided by hardware or by software units executing on the device (104) and/or current compensation system (106), as the case may be. The software units may be stored in a memory component (404) and instructions may be provided to the processor (402) to carry out the functionality of the described components.

The current compensation system (106) may include a Thévenin parameter data structure compiling component (410). The Thévenin parameter data structure compiling component (410) may be arranged to compile Thévenin parameter data structures for one or more of a Thévenin voltage, resistance and inductance. Each data structure may have values for each of the one or more lines (or wires) at each of a predetermined set of frequencies. The values may have been obtained at the point of common coupling of the device to a power network (102).

The current compensation system (106) may include an offset data structure compiling component (412) arranged to compile an offset data structure. The offset data structure may include offset values, each of which is to be applied to a corresponding value of the Thévenin voltage data structure to output an offset Thévenin voltage data structure. The offset values may be calculated to satisfy physical constraints associated with the power network (102).

The current compensation system (106) may include an offset Thévenin voltage data structure compiling component (414) arranged to compile the offset Thévenin voltage data structure.

The current compensation system (106) may include an optimal point of common coupling power data structure compiling component (416). The optimal point of common coupling power data structure compiling component (416) may be arranged to compile an optimal point of common coupling power data structure including values having been determined based on a specific amount of total power at the point of common coupling and the offset Thévenin voltage data structure or a derivative thereof.

The current compensation system (106) may include a current component calculating component (418) arranged to calculate current components for each line and for each of the predetermined set of frequencies. The current components may be calculated using the optimal point of common coupling power data structure and the offset Thévenin voltage data structure. The current components may be calculated for injection into or extraction from corresponding lines at the point of common coupling so as to inject or extract a specific total amount of power in a manner that reduces total electrical transmission losses of the power network.

The current compensation system (106) may include a current injecting/extracting component (420) for controlling injection or extraction of currents associated with the current components to reduce total electrical transmission losses of the power network. The currents may be injected or extracted, as the case may be, at the point of common coupling. The current injecting/extracting component (420) may be configured to instruct or control the device (104) to inject or extract currents at the point of common coupling based on the current component values.

The system (400) may include a connector (422) configured for electrically connecting the device (104) and/or current compensation system (106) to the power network (102) at the point of common coupling.

The system (400) may include a measurement component (424) which measures voltage signals and line currents at the point of common coupling via the connector (422). The measurement component (424) may further be configured to measure Thévenin resistance and inductance via the connector (422). In some implementations, the current injecting/extracting component (420) may control injecting or extracting currents associated with the current components via the connector (422).

In some implementations, the system (400) may include an apparatus which provides the connector (422) and/or measurement component (424). In some implementations, it may be that the device (104) includes or incorporates such an apparatus while in other implementations the apparatus may be separate from, but in data communication with, the device (104) such that measurements and other values or data may be shared between the apparatus and device (104).

Use of the term 'line' herein includes any wire in a power network and should not be construed to exclude a ground or earth return line or wire.

The term data structure as used herein should be interpreted to include any arrangement of data (such as values) configured for storage, use, manipulation and/or processing in a computing device. Example data structures may for example include a payload of a digital message, a file, a list, a table, a pointer to a location in memory in which values associated with the data structure are stored, and the like.

Aspects of the present disclosure provide a generalized derivation of active currents in the frequency domain. A point of reference for all voltages is transferred to a Thévenin equivalent point. The formulation of active currents in the frequency domain is generalized as $I_A = K_A V_{Th(null)} R^{-1}$, where $V_{Th(null)}$ is a voltage vector representing all the equivalent Thévenin voltages of the equivalent circuit of the network (source) as seen from the PCC. Each voltage component, h, differs from the others in that each has its own specific reference, not necessarily the same for all frequency components. This necessary "multiple" reference is related to Kirchhoff's current law. Characteristics of the systems and methods described herein include: the voltages at the Thévenin point are the voltages measured at the PCC and transferred to the Thévenin point where they are defined according to a specified reference; the optimal power is at the Thévenin point after compensation and not the power at the load; weighted voltage references are specific to each and every frequency voltage component, so that $$\sum_{1}^{M} \frac{VTh_{m,h}}{Rm, h} = 0$$

is always true for all h; and, $$K_A = \frac{P_{Th(OPT)}}{\|V'_{Th(null)}\|^2} \text{ and not } \frac{P_{PCC}}{\|U\|^2}$$

where $P_{PTh(opt)} = P_{PCC}$ and $$\|I'_A\| = 1/2(-\|V'_{Th(null)}\| - /+\sqrt{(\|V'_{Th(null)}\|^2 + 4P_{PCC})}).$$

Aspects of the present application may be robust to: line voltages at the PCC changing after compensation, the presence of non-negligible line resistances, and the presence of zero sequence voltage components.

Theoretical development of the system and method described herein may involve one or more of the following stages: setting up the input matrices; a theorem and proof of the relationships between PCC and PTh; identifying the Thévenin side voltage vector; defining the reference offsets from the PCC side; finding VTh (null) by subtracting the offsets; identifying the weighted Thévenin vector; finding P at the Thévenin point and the multiplier $K_A$; and, identifying the individual CRMS solution current components. The problem can be considered as a transportation problem where the same power as before compensation is transported but with minimal power losses. Other constraints are: the power consumed (or generated) at the PCC remains constant, and Kirchhoff's current law applies to all line currents and their respective current components. It should however be appreciated that the order of the steps followed to calculate the minimal loss current CRMS vector, representing the optimal current components that will deliver a given amount of power to a PCC point with minimal losses, may not be the same as the order of the theoretical development. These steps lead to reconciliation of the losses without and with (or before and after) compensation and, therefore, identify the power factor before compensation.

In what follows, two examples are described in which calculations were performed in a spreadsheet. Example 1 demonstrates a solution of a measurement with only fundamental frequency waveforms, In Example 2 some harmonic content is added.

Example 1

Figure 5:
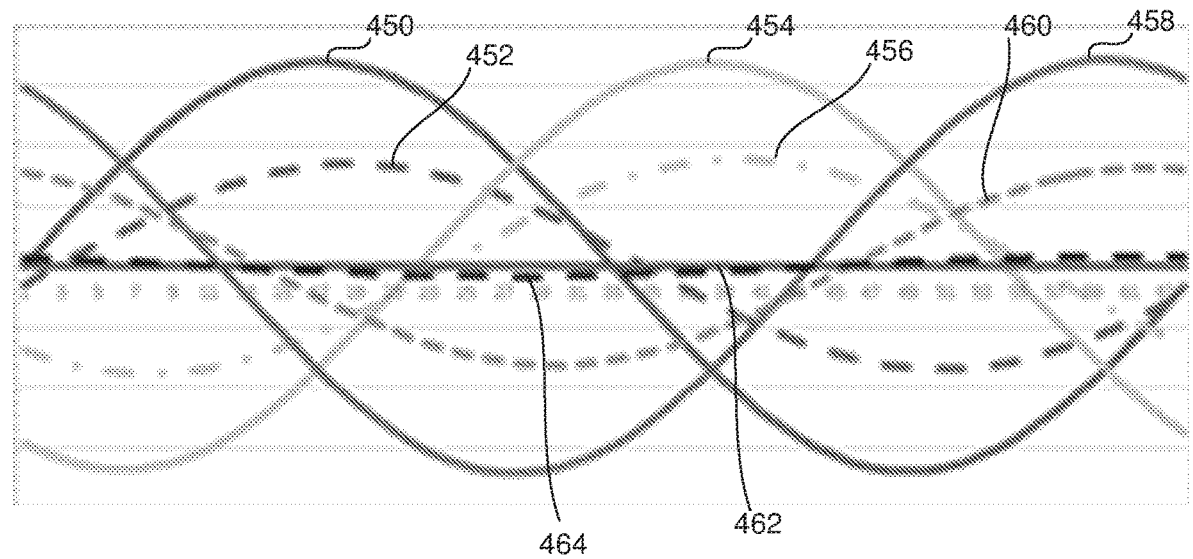
FIG. 5 is a plot from Example 1 of voltage and current waveforms for each of four lines in a power network at the point of common coupling before compensation.

The first example considers three phases without a neutral wire and with only fundamental frequency waveforms (no harmonics). The example is compiled using arbitrary sinusoidal waveforms and phase shifts to give unbalanced currents, illustrated in FIG. 5, and unequal line resistances and inductances. The waveforms can be used to solve for the compensator currents and the power factor before compensation.

Measurements of line voltages (450, 454, 458, 462) and currents (452, 456, 460, 464) from an arbitrary reference may be obtained and frequency components may be derived. The obtained values may be converted to CRMS values, including constructing two M×(H+1) dimensional vectors U and $I_S$. Thévenin equivalent impedances R(m,h) and X(m,h), may be used to determine the losses before any compensation. Vth(m,n) line voltages may be calculated with respect to the original PCC side common reference. The reference offsets may be calculated from original PCC side and $V_{TH(null)}$ may be calculated by subtracting the respective $e_{refh}$ offsets from $V_{TH(m,h)}$. The common parameter $$K_A = \frac{P_{TH(OPT)}}{\|V'_{TH(null)}\|^2}$$

may then be calculated, with $P_{PTH(OPT)} = P_{PCC} + \|I_A'\|^2$ and $P_{PCC} = <U, I_S>$. The compensating currents may then be determined from $I_A = K_A V_{TH(null)} R^{-1}$ and the losses after compensation determined from $\|I_A'\|^2$. New PCC line voltages from VTh, the wire impedances and the now optimal line currents may then be calculated. Thereafter, compensation current components h to be injected by the compensator may be determined by subtracting $I_A$ from $I_S$.

Figure 6:
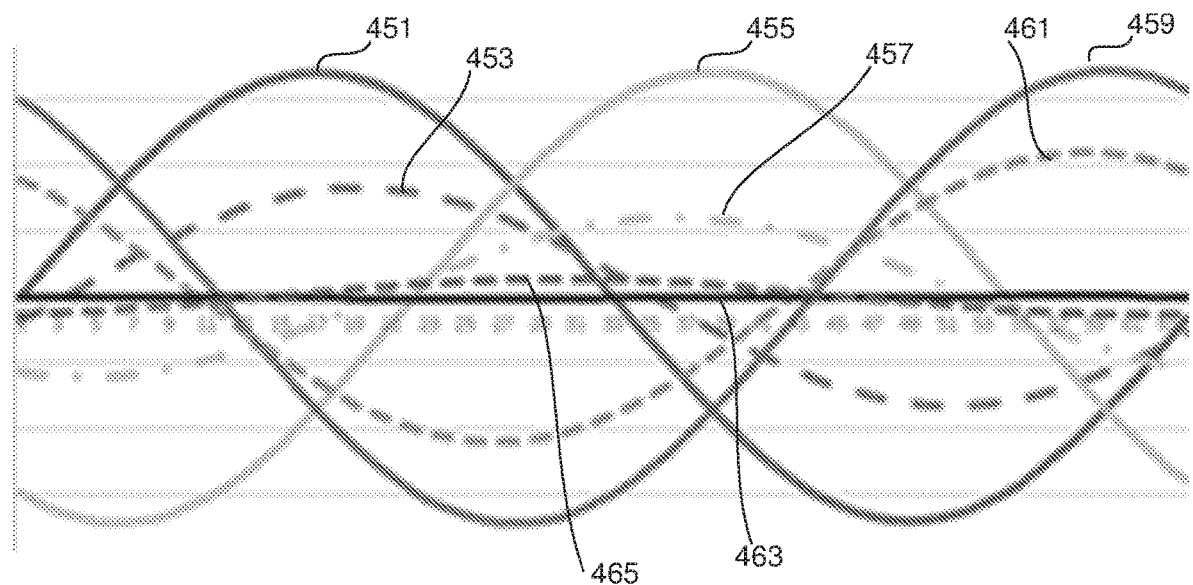
FIG. 6 is the plot from Example 1 showing the line voltage and current waveforms after compensation.

Although the power $P_{PCC}$ delivered to the PCC before and after compensation does not change, the voltages do, according to the reallocated wire currents and lower losses after compensation. The voltages (451, 455, 459, 463) and currents (453, 457, 461, 465) at the PCC after compensation are illustrated in FIG. 6, in which it is clear that the currents are not necessarily in phase with the voltages when the delivery losses are minimized.

Example 2

The second example comprises a three-wire system with the fundamental, dc and 3rd, 5th and 7th harmonic components, and with frequency-dependent impedances. The input values are the CRMS voltages measured from PCC-side and line currents at the PCC, line resistances Rm,h and Lm,h for all lines from m=1 to M and harmonics h=0 to H.

To demonstrate the relative effects of unbalance and the harmonics, the values of the fundamental frequency components are the same as those in Example 1. The dc and three harmonic components have been added to shape the voltages towards a square wave and the current components are arbitrary.

Figure 7:
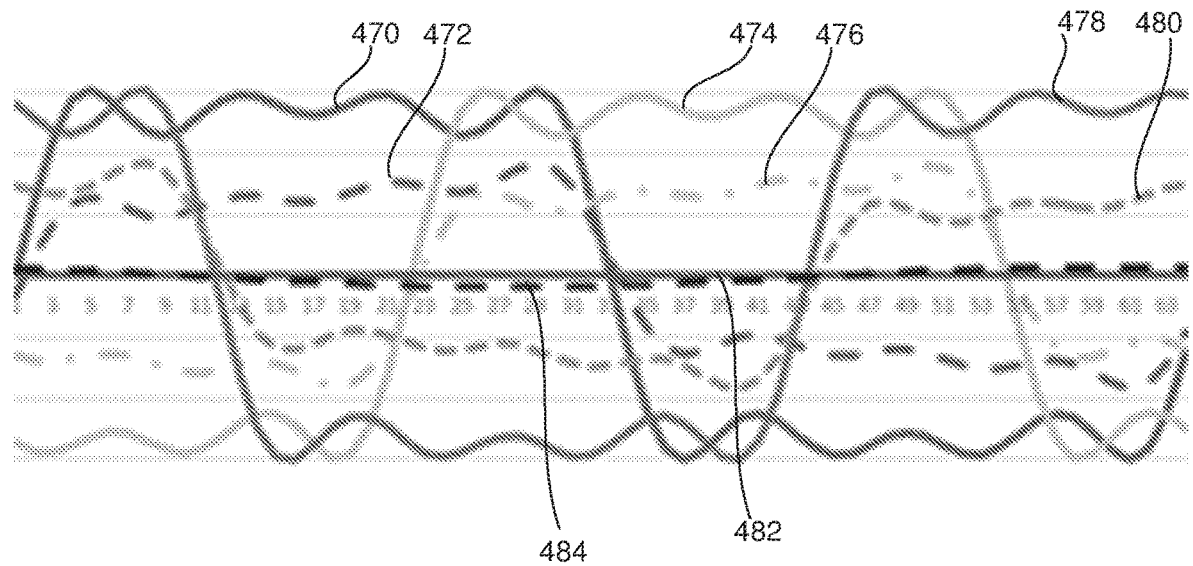
FIG. 7 is a plot from Example 2 of voltage and current waveforms with dc and harmonic components for each of four lines in a power network at the point of common coupling before compensation.
Figure 8:
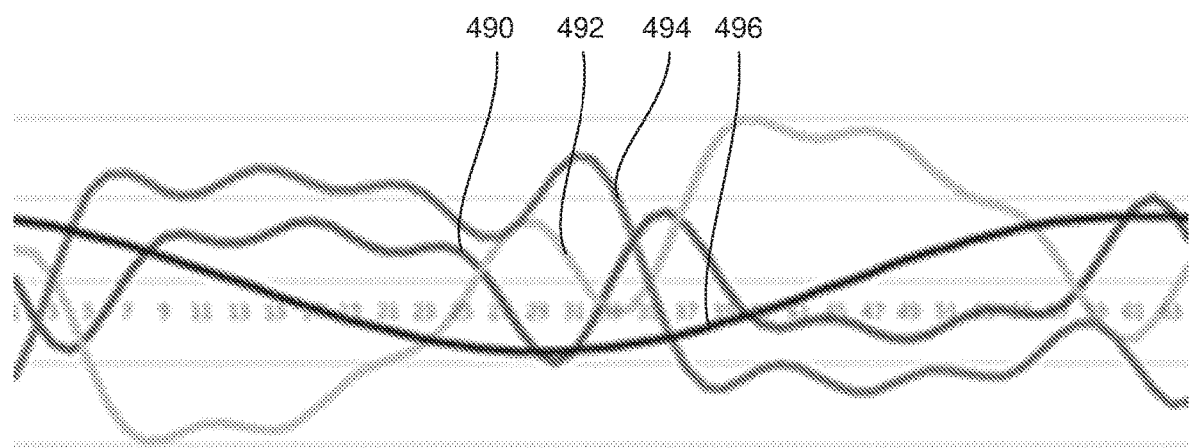
FIG. 8 is the plot from Example 2 of compensation current waveforms in each wire of the power network at the point of common coupling.

The voltage (470, 474, 478, 482) and current (472, 476, 480, 484) waveforms with dc and harmonic components at the PCC before compensation are illustrated in FIG. 7. The compensation current (490, 492, 494, 496) waveforms in each wire at the PCC are illustrated in FIG. 8.

A conventional approach to power factor, approximating example 1 with balanced currents and 10° current displacement gives a power factor of 0.98. Including the delivery system with unbalanced impedances reduces the power factor to 0.93; with unbalanced sinusoidal voltages and currents the power factor reduces to 0.914 calculated in Example 1; and with the harmonics added it reduces to 0.908, shown in Example 2. All conditions violating assumptions about balanced Thévenin sources and wire impedances, and balanced sinusoidal waveforms affect the calculation of the power factor.

The formulation of the generalised power theory in the frequency domain removes previous restrictions of frequency independent parameters and any dependence on processing instantaneous measurement values. While instantaneous measurement values are still needed for the Fourier transform, they can be processed locally and do not need to be communicated to the current compensation system. The identification and computation of the active elements of current and power, and the compensation required, are defined in linear algebra and illustrated by means of two examples. $I_A = K_A V_{Th(null)} R^{-1}$ is a more generalized formulae and excludes assumptions such as equal line resistors and inductances, invariant voltages with compensation, frequency independent line resistors and inductances. Aspects of the present disclosure allow all the active CRMS current components $I_{A(m,h)}$ for all m wires and all h orders of frequency to be determined. All components of active current may be one or more of: proportional to a common factor $K_A$; proportional to each of their respective weighted Thévenin voltages CRMS components $V_{Th(null)(m,h)}$ measured from their respective harmonic weighted null point reference; and, inversely proportional to the respective wire resistances.

Example 3

Figure 9:
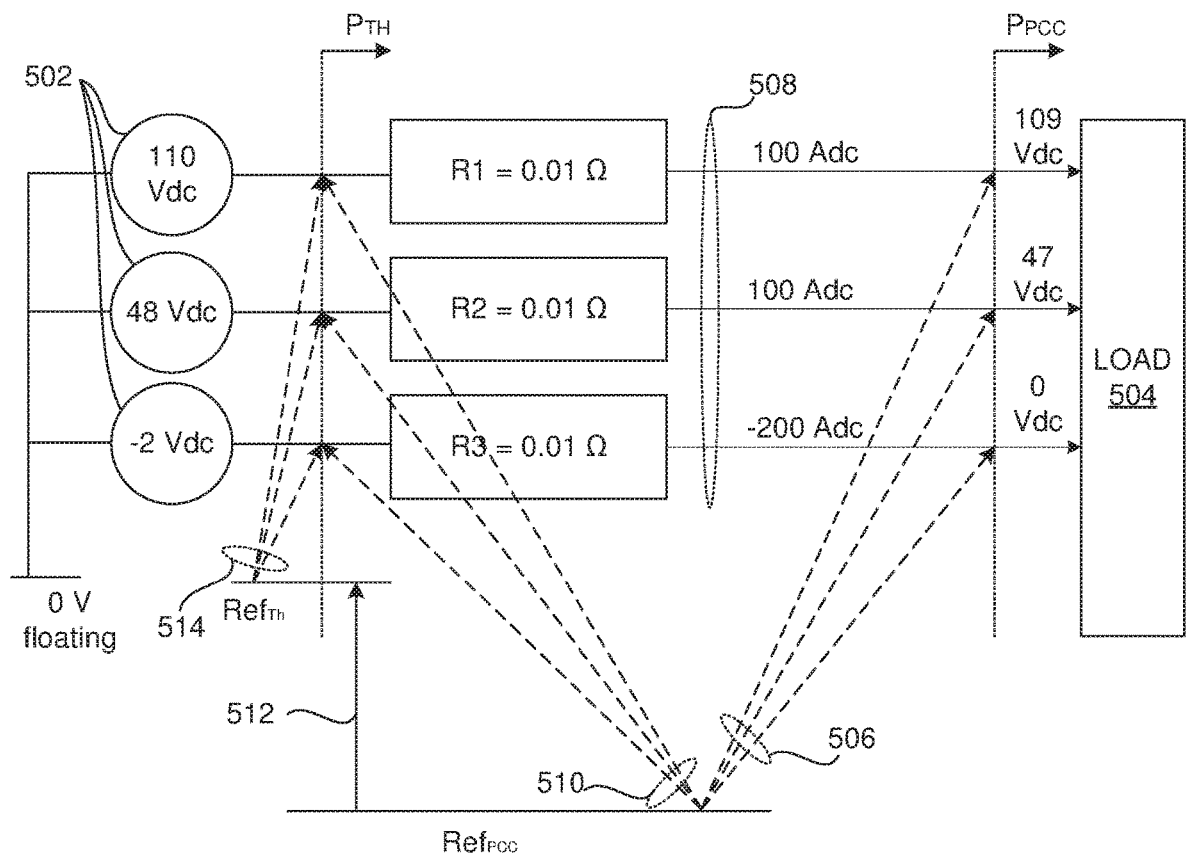
FIG. 9 is a schematic diagram which illustrates an example three-wire dc supply with unbalanced voltages through wires of equal resistance to a resistive load.

Example 3 considers three dc voltage sources (502) supplying power through a 3-wire delivery system to a resistive load (504), as illustrated in FIG. 9. Using the systems and methods described herein, the optimum wire currents that would deliver the power to the load with the minimum losses can be determined.

With the measured voltages at the point of common coupling (506) being U={109, 47, 0} the current (508) being $I_S$={100, 100, −200}; and line resistances being R={0.01, 0.01, 0.01}, then the power at the point of common coupling is $P_{PCC} = <U, I_S> = 15600$ W. The weighted current vector is $I_S' = <I_S, R^{1/2}>$. Then, $\|I_S'\|^2 = I_S', I_S'> = 600$ W of line losses; giving the Thévenin power $P_{Th} = P_{PCC} + \|I_S'\|^2 = 15600 + 600 = 16200$ W. Calculating $V_{ThPCC}$ line voltages (510) with respect to original PCC side common reference, $V_{ThPCC}$={110, 48, −2}. The weighted null point offset (512) to subtract from above to obtain $V_{Th\_null}$ (514) is $e_{ref}$=52 V, giving $V_{Th(null)}$={58, −4, −54}. Then, calculating the proportionality constant, starting from the resistance-weighted voltage vector: $\|V_{Th}'\|^2 = <V_{Th}', V_{Th}'> = (58)^2/0,01 + (-4)^2/0,01 + (-54)^2/0,01 = 629600$. The minimum delivery loss is $\|I_A'\|^2 = \frac{1}{2}(-\|V_{Th}'\| - / + \sqrt{(\|V_{Th}'\|^2 + 4P_{PCC})}) = 406.9613$ W. The optimum power sent out from the Thévenin point is $P_{Th} = P_{PCC} + \|I_A'\|^2 = 16006.9613$ W, which gives $K_A = P_{Th-opt}/\|V_{Th}'\|^2 = 16006.9613/629600 = 0.25424$. Then the optimum wire currents $I_A$ are: $K_A V_{Th}/R$ = {147.46, −10.17, −137.29}. The voltages at the PCC after compensation would change from U={109, 47, 0} to $U^\#$={109.15, 48.73, 0}, making the delivered power 15600 W, the same as before compensation. The example shows that the generalized power theory approach described herein can improve the operation of multi-wire dc networks.

Example 4: Optimum Inverter-Based Generation into a Distribution Network

One of the characteristics of smart grids is the presence of distributed inverter-based generation. Most grid codes require these generators to feed into the network balanced currents at a conventionally defined power factor (pf), which might be unity, a specified value or controllable as volt/var voltage control. The effectiveness of the power injection on the avoidable loss is not a consideration. In this example, a generator injects power at the PCC into a network that, for simplicity of this example, is without distortion and balanced, except for a single-phase resistance load of 13 kW at an intermediate position, which unbalances the Thévenin parameters. In this example, the Thévenin impedances and voltages are typical of those that have been measured on a 400 V feeder in what may be expected from a light industrial area. Three conditions are modelled, injection by the inverter of 39.42 kW power as balanced currents into the lines at: conventionally defined pf=1; 0.95 lag; and, current injection optimally unbalanced according to the systems and methods described herein. For each case, the resistance of the intermediate load was adjusted to keep constant the total of the power at the load, responding to small changes in voltage. The useful power delivered to the Thévenin point is the difference between the injected power and the total losses. The table below presents the power delivered, losses, power system pf and apparent power for each condition.

| Inverter control | Minimum loss | Avoidable loss | Total loss | Power delivery | Power system pf | Apparent power, S |
| --- | --- | --- | --- | --- | --- | --- |
| Bal. upf | 2854 | 39 | 2893 | 36527 | 0.993 | 39688 |
| Bal. 0.95 lag | 2854 | 91 | 2945 | 36475 | 0.984 | 40047 |
| GPT | 2854 | 0 | 2854 | 36566 | 1.000 | 39420 |

In this example system with slight unbalance in one phase, the conventional control of the output of the inverter-based generation into the feeder, apparently at unity power factor (upf) or pf=0.95, is not clearly related to the feeder losses. On the other hand, injecting the inverter currents into the feeder according to $I_A$ identified based on the disclosure of the present application ("GPT") eliminates the avoidable losses that, otherwise, are only lost as heat from the conductors.

Aspects of the present disclosure enable the identification of minimum and avoidable delivery losses separately, and the required rearrangement of the line currents if compensation is implemented. The approach requires that the frequency-dependent Thévenin equivalent network parameters be known, and there are several ways of obtaining these parameters. Implications of the new approach include that the costs of losses can be allocated according to where and how they are incurred, which can guide technical and financial decisions. The approach may also affect international standards, tariff metering, the control of inverters and compensators, load flow analysis software, and smart grids.

Figure 10:
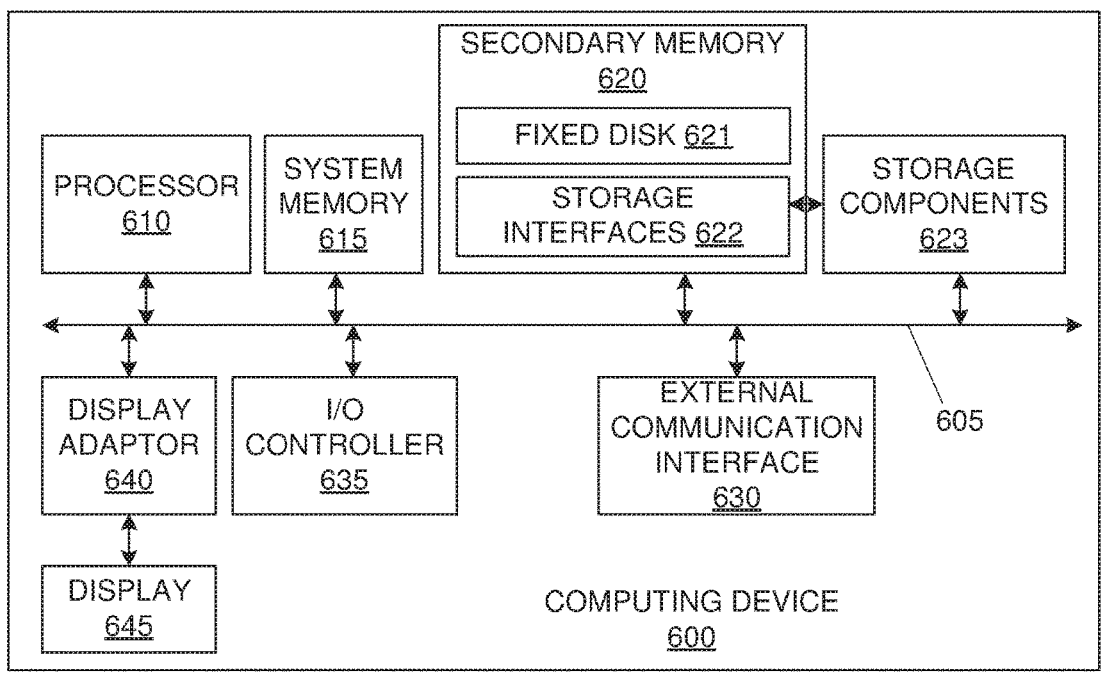
FIG. 10 illustrates an example of a computing device in which various aspects of the disclosure may be implemented.

FIG. 10 illustrates an example of a computing device (600) in which various aspects of the disclosure may be implemented. The computing device (600) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (600) may be suitable for storing and executing computer program code. The various participants and elements in the previously described system diagrams may use any suitable number of subsystems or components of the computing device (600) to facilitate the functions described herein. The computing device (600) may include subsystems or components interconnected via a communication infrastructure (605) (for example, a communications bus, a network, etc.). The computing device (600) may include one or more processors (610) and at least one memory component in the form of computer-readable media. The one or more processors (610) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (600) may be distributed over a number of physical locations (e.g. in a distributed, cluster or cloud-based computing configuration) and appropriate software units may be arranged to manage and/or process data on behalf of remote devices.

The memory components may include system memory (615), which may include read only memory (ROM) and random access memory (RAM). A basic input/output system (BIOS) may be stored in ROM. System software may be stored in the system memory (615) including operating system software. The memory components may also include secondary memory (620). The secondary memory (620) may include a fixed disk (621), such as a hard disk drive, solid state drive, etc., and, optionally, one or more storage interfaces (622) for interfacing with storage components (623), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (600) may include an external communications interface (630) for operation of the computing device (600) in a networked environment enabling transfer of data between multiple computing devices (600) and/or the Internet. Data transferred via the external communications interface (630) may be in the form of signals, which may be electronic, electromagnetic, optical, radio, or other types of signal. The external communications interface (630) may enable communication of data between the computing device (600) and other computing devices including servers and external storage facilities. Web services may be accessible by and/or from the computing device (600) via the communications interface (630).

The external communications interface (630) may be configured for connection to wireless communication channels (e.g., a cellular telephone network (3G, LTE, etc.), wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (610). A computer program product may be provided by a non-transient computer-readable medium, or may be provided via a signal or other transient means via the communications interface (630).

Interconnection via the communication infrastructure (605) allows the one or more processors (610) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (600) either directly or via an I/O controller (635). One or more displays (645) (which may be touch-sensitive displays) may be coupled to or integrally formed with the computing device (600) via a display (645) or video adapter (640).

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™' C++, or Perl™ using, for example, conventional or object-oriented techniques. The computer program code may be stored as a series of instructions, or commands on a non-transitory computer-readable medium, such as a random access memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof. The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims. Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A computer-implemented method for frequency domain-based determination of currents for injection into a power network, the method comprising:
compiling Thévenin parameter data structures for each of a Thévenin voltage, resistance and inductance, wherein each data structure has values for each of one or more lines at each of a predetermined set of frequencies, the values having been obtained at a point of common coupling to a power network having the one or more lines;
compiling an offset data structure including offset values, each of which is to be applied to a corresponding value of the Thévenin voltage data structure to output an offset Thévenin voltage data structure, wherein the offset values are calculated to satisfy physical constraints associated with the power network;
compiling the offset Thévenin voltage data structure;
compiling an optimal point of common coupling power data structure including values having been determined based on a specific amount of total power at the point of common coupling and the offset Thévenin voltage data structure or a derivative thereof;
using the optimal point of common coupling power data structure and the offset Thévenin voltage data structure to calculate current components for each line and for each of the predetermined set of frequencies for determining current for injection into or extraction from corresponding lines at the point of common coupling so as to inject or extract a specific total amount of power in a manner that reduces total electrical transmission losses of the power network; and,
controlling injecting or extracting, at the point of common coupling, currents associated with the current components to reduce total electrical transmission losses of the power network.

2. The method as claimed in claim 1, including determining the offset values, wherein determining the offset values is based on a projection of the Thévenin voltage data structure or a weighted Thévenin voltage data structure onto vectors in a solution subspace in which the current components are to reside.

3. The method as claimed in claim 2, wherein the vectors in the solution subspace are represented by solution subspace data structures.

4. The method as claimed in claim 2, wherein a solution subspace data structure is provided for each of the number of frequencies in the predetermined set of frequencies, and wherein values of each of the solution subspace data structures represent vectors which are orthogonal to each other.

5. The method as claimed in claim 1, wherein the offset values are calculated to satisfy physical constraints including one or both of Kirchhoff's current law and the requirement that values of the optimal point of common coupling power data structure remain the same before and after injection or extraction of the current components.

6. The method as claimed in claim 4, wherein the values of the solution subspace data structures include the values of the Thévenin resistance and inductance data structure.

7. The method as claimed in claim 1, wherein values of the Thévenin parameter data structures are time variable values in the form of frequency domain-based complex root mean square (CRMS) values.

8. The method as claimed in claim 1, wherein the method is conducted at the point of common coupling by a device coupled to the power network.

9. The method as claimed in claim 1, wherein the specific amount of total power at the point of common coupling is a specific amount of total average power over a predetermined time period.

10. A system for frequency domain-based determination of currents for injection into a power network, the system including a memory for storing computer-readable program code and a processor for executing the computer-readable program code, the system comprising:
a Thévenin parameter data structure compiling component for compiling Thévenin parameter data structures for each of a Thévenin voltage, resistance and inductance, wherein each data structure has values for each of one or more lines at each of a predetermined set of frequencies, the values having been obtained at a point of common coupling to a power network having the one or more lines;
an offset data structure compiling component for compiling an offset data structure including offset values, each of which is to be applied to a corresponding value of the Thévenin voltage data structure to output an offset Thévenin voltage data structure, wherein the offset values are calculated to satisfy physical constraints associated with the power network;
an offset Thévenin voltage data structure compiling component for compiling the offset Thévenin voltage data structure;
an optimal point of common coupling power data structure compiling component for compiling an optimal point of common coupling power data structure including values having been determined based on a specific amount of total power at the point of common coupling and the offset Thévenin voltage data structure or a derivative thereof;
a current component calculating component for calculating, using the optimal point of common coupling power data structure and the offset Thévenin voltage data structure, current components for each line and for each of the predetermined set of frequencies for determining current for injection into or extraction from corresponding lines at the point of common coupling so as to inject or extract a specific total amount of power in a manner that reduces total electrical transmission losses of the power network; and,
a current injecting/extracting component for controlling injecting or extracting, at the point of common coupling, currents associated with the current components to reduce total electrical transmission losses of the power network.

11. The system as claimed in claim 10 including a connector configured for electrically connecting to the power network at the point of common coupling, wherein the current injecting/extracting component controls injecting or extracting currents associated with the current components via the connector.

12. A computer program product for frequency domain-based determination of currents for injection into a power network, the computer program product comprising a computer-readable medium having stored computer-readable program code for performing the steps of:
compiling Thévenin parameter data structures for each of a Thévenin voltage, resistance and inductance, wherein each data structure has values for each of one or more lines at each of a predetermined set of frequencies, the values having been obtained at a point of common coupling to a power network having the one or more lines;

compiling an offset data structure including offset values, each of which is to be applied to a corresponding value of the Thévenin voltage data structure to output an offset Thévenin voltage data structure, wherein the offset values are calculated to satisfy physical constraints associated with the power network;

compiling the offset Thévenin voltage data structure;

compiling an optimal point of common coupling power data structure including values having been determined based on a specific amount of total power at the point of common coupling and the offset Thévenin voltage data structure or a derivative thereof;

using the optimal point of common coupling power data structure and the offset Thévenin voltage data structure to calculate current components for each line and for each of the predetermined set of frequencies for determining current for injection into or extraction from corresponding lines at the point of common coupling so as to inject or extract a specific total amount of power in a manner that reduces total electrical transmission losses of the power network; and, controlling injecting or extracting, at the point of common coupling, currents associated with the current components to reduce total electrical transmission losses of the power network.

* * * * *